A. H. FRIEDEL.
FLYING MACHINE.
APPLICATION FILED OCT. 13, 1908.
984,269.
Patented Feb. 14, 1911.
3 SHEETS—SHEET 1.
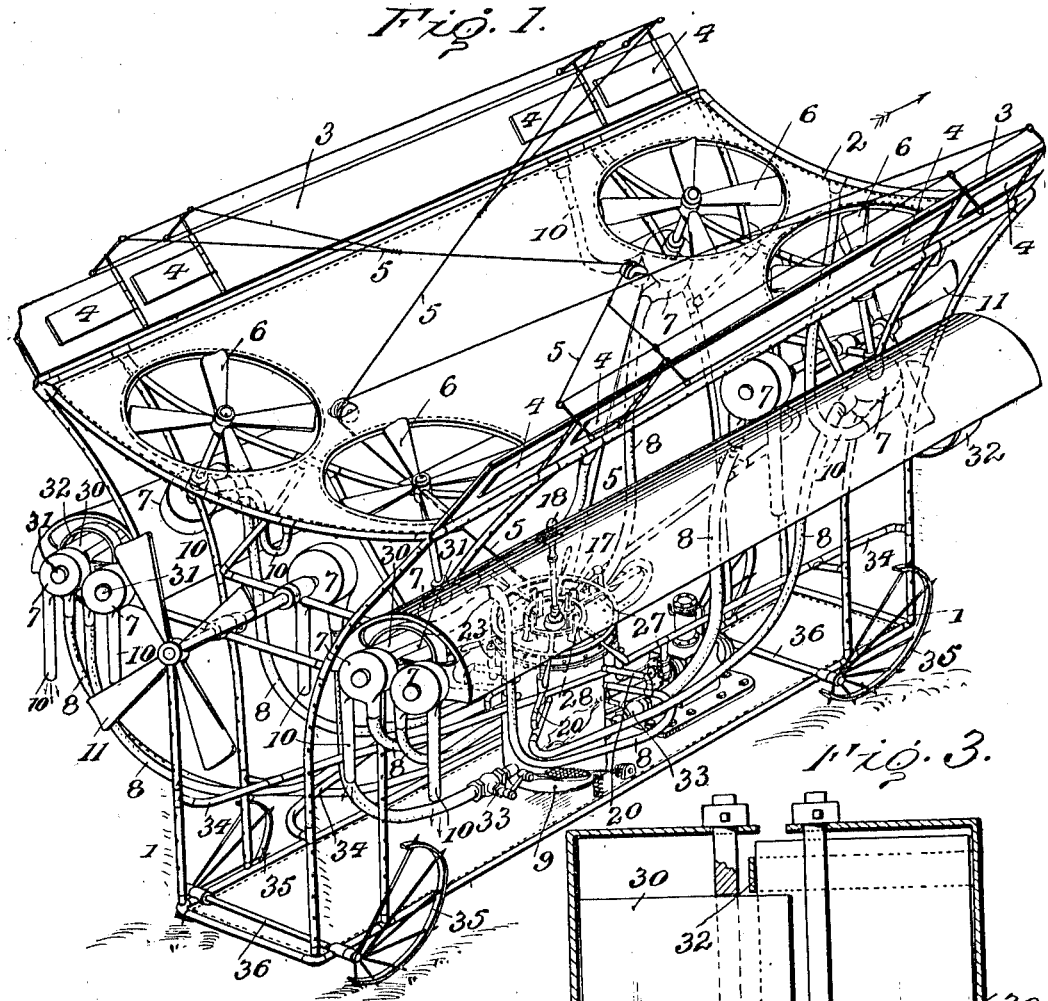

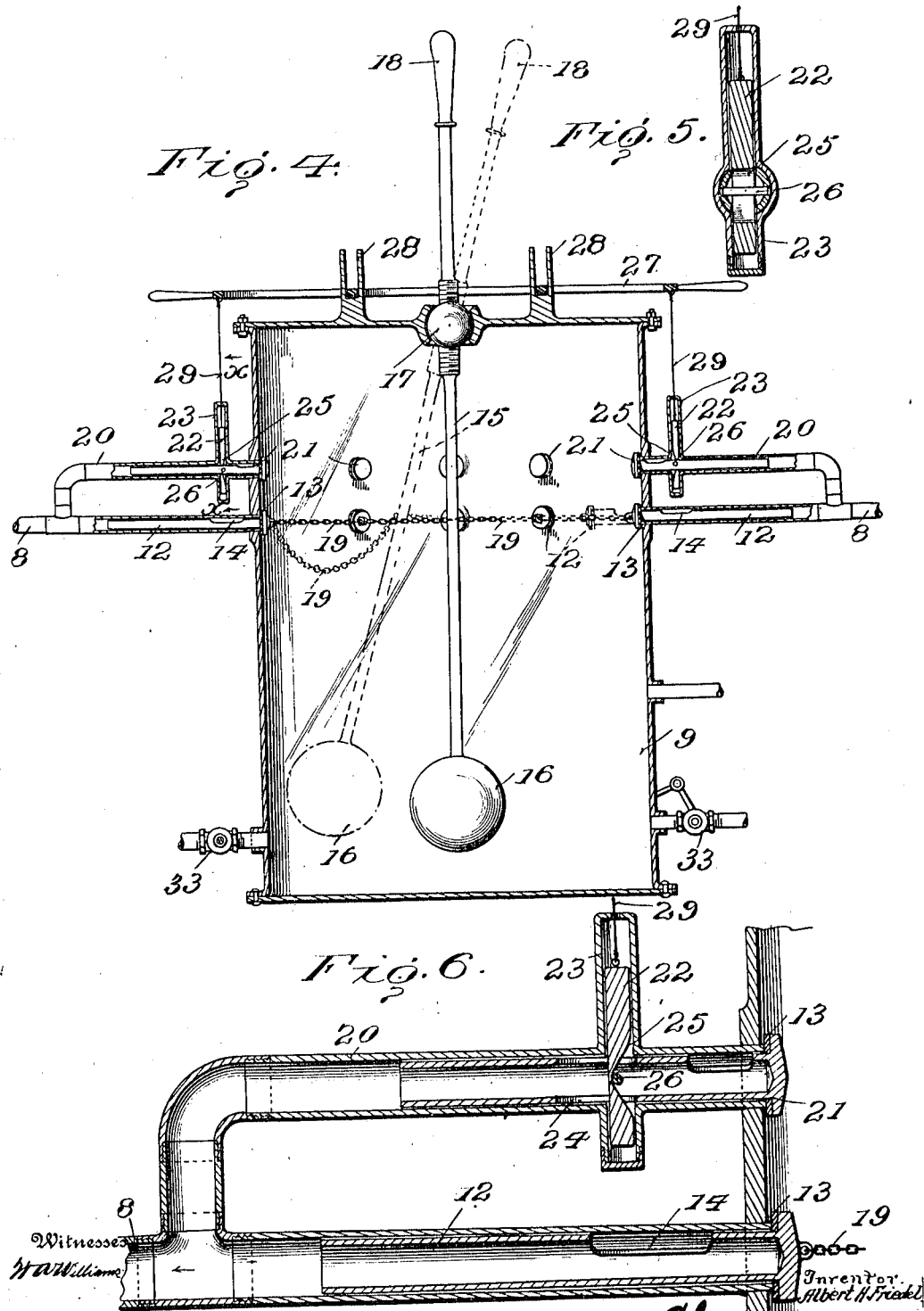

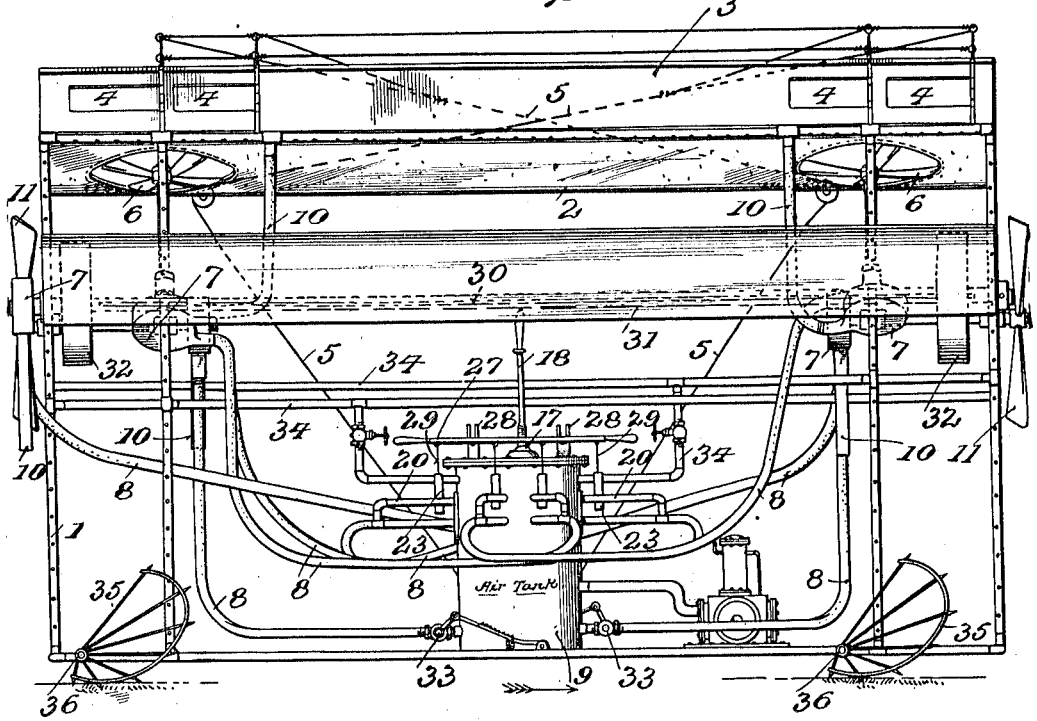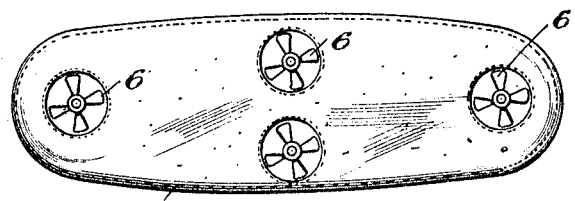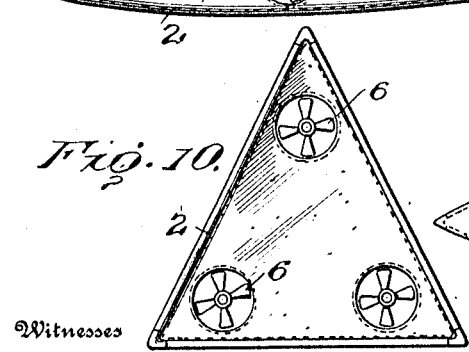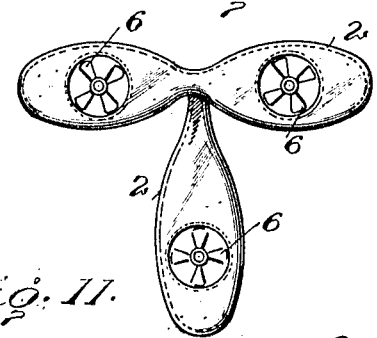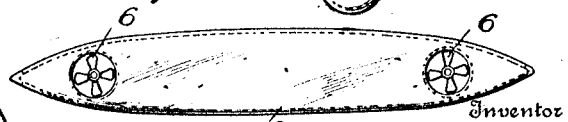

UNITED STATES PATENT OFFICE.

ALBERT HUGO FRIEDEL, OF BALTIMORE, MARYLAND.

FLYING-MACHINE.

984,269.

Specification of Letters Patent.  Patented Feb. 14, 1911.

Application filed October 13, 1908. Serial No. 457,569.

*To all whom it may concern:*

Be it known that I, ALBERT HUGO FRIEDEL, a citizen of the United States, residing at Baltimore, State of Maryland, have invented certain new and useful Improvements in Flying-Machines, of which the following is a specification.

The present invention relates to machines for navigating the air and operable without a buoyant field, and embodying planes and a plurality of fans which are arranged with reference to both lifting and propelling.

The essential feature of the invention is the arrangement of the lifting propellers upon opposite sides of a medial line, and to provide each with operating means automatically controlled by change of level of the machine so that same may be caused to glide on an even keel and thereby prevent overturning or the machine running upon a dangerous slant.

The invention contemplates supplying each fan with a motor and to provide a valve mechanism for controlling the supply of motive medium to each motor, said valve mechanism being governed by a gravity device, whereby upon the machine inclining or departing from an even keel, the supply of motive medium to the motors on the lower side is increased or relatively so, with a view to increase the speed of the fans and thereby lift the lower side of the machine and bring same to an even keel.

The invention also contemplates manually operable devices for admitting the motive fluid to the several motors independently of the gravity operated governing means.

While the invention may be adapted to different forms and conditions by changes in the structure and minor details without departing from the spirit or essential features thereof, still the preferred embodiment is shown in the accompanying drawings, in which—

Figure 1 is a perspective view of a flying machine embodying the invention. Fig. 2 is an end view of coöperating lifting planes. Fig. 3 is a plan view of the parts shown in Fig. 2, the gravity plane being in horizontal section. Fig. 4 is a sectional view of the reservoir for containing compressed air, showing the valve mechanism and the gravity operated governor therefor. Fig. 5 is a sectional view of an automatic valve on the line $x$—$x$ of Fig. 4, looking in the direction of the arrows and showing the same on a larger scale. Fig. 6 is a sectional view of main and branch pipes showing the coöperating valves, the parts being on a larger scale. Fig. 7 is a side view of the machine. Figs. 8, 9, 10 and 11 show different forms of aeroplanes.

Corresponding and like parts are referred to in the following description and indicated in all the views of the drawings by the same reference characters.

The machine may be of any design and construction best adapted for the purposes, and comprises a suitable framework 1 which supports the several aeroplanes, lifting and propelling fans, motors, car and adjunctive parts. The plane 2 is arranged at the top of the machine and occupies an approximately horizontal position and curves slightly transversely. Other planes 3 are located at the sides of the horizontal plane 2 and incline upwardly and outwardly and serve to assist in preventing the tilting of the machine. The several planes are suitably braced or stayed. The side planes 3 are provided near their ends with wings 4 set in openings therein, said wings being oblong and pivotally supported at their front ends. The several wings 4 are attached to shafts which are provided with cranks to which operating cords 5 are connected, and the operating cords after passing over suitable arrangements of guide pulleys extend within convenient reach of the aviator, to admit of the wings being opened more or less to assist materially in directing and controlling the movements of the machine.

Openings are provided in the four corners of the horizontal plane 2 and lifting fans 6 are arranged to operate therein, said fans being of ordinary construction and attached to shafts which incline slightly to the perpendicular and are provided with motors 7. Each fan has its own motor 7 and the latter may be of any variety but it is preferred to employ motors of the rotary type so as to be operated by compressed air, which is stored in a suitable reservoir. A pipe 8 supplies the compressed air or like motive medium to each motor and communicates with the reservoir 9 in which the compressed air is stored. A pipe 10 connects with each motor to carry off the spent or exhaust air and these pipes are provided in their length with a series of minute openings, facing downward, so as to discharge the spent air in a series of jets, in a way to materially assist in both lifting and propelling the machine by impact with the atmosphere.

Driving propellers 11 are located at opposite ends of the machine and are centrally disposed and operate jointly to propel the machine through the air. The propellers 11, like the fans 6 may be of any approved construction and are fast to shafts to which motors 7 are attached, said motors being provided with supply and exhaust pipes 8 and 10 respectively, the pipes coöperating with the motors being attached to the shafts of the fans 6. Inasmuch as the several supply pipes 8 are connected to the reservoir 9 in like manner a detailed description of one only will be given. A valve 12 is arranged in the end of the pipe 8 and comprises a hollow stem and a head, the latter closing against the end of the pipe. (See Fig. 6.) A packing 13 is fitted upon the stem of the valve and against the head thereof and insures a close fit between the valve and the end of the pipe. When the valve is moved inward an opening 14 in a side of the hollow stem establishes communication between the reservoir and the pipe and admits of compressed air passing from the reservoir into the pipe and thence to the motor for operating the fan or propeller arranged to be driven thereby. The several valves 12 are connected to a gravity operated governor which consists of a rod or bar 15 having a weight 16 and suspended by a universal joint 17, so as to swing in all directions. The rod or bar 15 projects and terminates in a handle 18, to be conveniently grasped by the aviator. The gravity operated governor is preferably arranged to operate in the reservoir 9 and is suspended in the top of said reservoir by means of the universal joint 17. A chain 19 or like connection forms a tie between each of the valves 12 and the rod or bar 15 of the gravity operated governor. It is to be understood that the rod or bar 15 at all times occupies a vertical position irrespective of the relative position of the machine, hence should the machine tilt laterally or longitudinally, the valve connected with the governor and controlling the supply pipe leading to the fan or propeller on the low side is open thereby permitting a larger supply of motive medium to the fan or propeller on the low side with the result that the machine being subjected to greater lifting force on the low side is arighted or leveled and brought back to an even keel. It is to be understood that the valve is opened more or less according to the degree of inclination of the machine from a horizontal position, hence the speed of the fan or propeller is proportionately increased so as to remedy the disturbing influence and bring the machine to a balance. By extending the rod or bar 15 the series of valves 12 may be manually operated, independently of the gravity operated governor, this being of advantage in an emergency, or for other purposes necessitating the driving of the fans or propellers at unequal speeds to attain a desired result.

A pipe 20 connects with each supply pipe 8 and forms in effect a branch thereof. The branch pipes 20 likewise connect with the reservoir 9 and each is provided with a valve 21 similar in construction and operation to the valve 12. The valves 21 are adapted to be operated by hand only so as to control the supply of compressed air to the motors. The means for operating the valves 21 consist of bars 22 which are arranged to operate in hollow guides 23 connected with the branch pipes 20. The bars 22 pass through openings 24 in opposite sides of the hollow stems of the valves 21, and are provided with inclined portions 25 which engage with pins 26 of the valves 21, so as to open said valves when required.

A wheel 27 is conveniently located to be operated by hand and is connected with each of the bars 22 so as to operate all at the same instant whereby the several lifting fans are started together, thereby maintaining the machine parallel to a nominal position at all stages of its ascent. The wheel 27 is provided at intervals around its outer rim with grips or handles comprising concentric rings and spokes, the latter being extended to form the grips as shown most clearly in Fig. 1. Guides 28 direct the wheel 27 in its movements, said guides consisting of posts projecting upward from the top of the reservoir and having their upper portions bifurcated to receive a ring of the wheel thereby preventing lateral displacement thereof. Suitable connections 29 are interposed between the wheel and the bars 22 and may consist of wire, chains or the like. When the wheel 27 is moved upward all the valves 21 are opened and the compressed air passes to the motors of the lifting fans and the latter are simultaneously actuated, thereby moving the machine at all points. Should the machine from any cause depart from an even keel the gravity operated governor comes into play and opens the valve or valves 12, controlling the pipes by means of which compressed air is supplied to the fans or propellers on the low side with the result hereinbefore stated. Supplementing the action of the lifting fans are pairs of lifting planes, a pair being located at each side of the machine and preferably below the longitudinal edge portions of the horizontal plane 2. These lifting planes extend nearly or entirely the whole length of the machine. The lifting planes and adjunctive parts of the machine, are duplicated at each side thereof, hence a detailed description of one will answer for a clear understanding of both. Each lifting plane 30 is mounted in a shaft 31 so as to receive a transverse slidable movement whereby portions of the planes project to unequal distances beyond their respective shafts.

The parts are so arranged that the edge portions of the planes on the descending side present a larger area of surface than the edge portions of the ascending side, thereby forming a minimum resistance to the part of the planes in their ascent and a maximum amount of resistance to the portions descending. This results in a maximum lifting force and a minimum resistance to the ascending machine. The shafts 31 are formed with diametrical slots in which the planes 30 are slidably mounted, said planes being transversely moved by suitable guides as the shafts rotate. The transverse movement of the planes may be effected in any manner and for convenience of illustration cams 32 are provided as shown most clearly in Figs. 2 and 3. The cams 32 engage with the end portions of the planes and in the rotation of the latter move them transversely of the shafts, so as to attain the results stated, namely a maximum amount of surface on the descending side and a minimum surface on the ascending side of the planes. Motors 7 are fitted to the shafts 31 and are connected by pipes 8 to the reservoir 9.

A treadle operated valve 33 is located in the length of the pipes running to the motors of the lifting planes, thereby admitting of the supply of air to said motors being controlled by foot, thereby leaving the hands of the aviator free to manipulate other controlling parts of the machine.

A machine of the character herein disclosed is lifted directly and does not require an initial forward movement as is generally required by heavier than air machines devoid of lifting propellers and requiring inclined planes to ride upon the air in the forward movement of the machine. By properly controlling the speed of the moving fans and planes the machine may be maintained at any desired elevation. It will thus be understood that the machine may be directly held in suspension over a given point and may be driven forward or backward by controlling the direction of rotation of the propellers. It is further observed that the machine may be driven at any speed within its capacity, since the propulsion is not dependent upon the lifting or sustaining means, in any wise, the latter being wholly independent of the propelling means. The descent of the machine may be regulated by driving the lifting fans and propellers at a greater or less speed.

The framework of the machine may be formed of solid or tubular bars the latter being preferred since the spent motive medium may be exhausted therefrom through minute openings which may be so disposed as to be utilized both in lifting and propelling the machine. The exhaust pipes 10 from the several motors are connected to the uprights of the frame-work so that when required motive medium may be conducted thereto to direct the machine to the right or to the left, according to the prescribed course.

As indicated most clearly in Fig. 7 valved pipes 34 connect directly with the air reservoir and with the uprights of the framework, and by proper manipulation of the valves governing said pipes 34, the motive medium from the reservoir is admitted into opposite uprights thereby enabling the machine to be quickly directed from a straight course as may be required either for steering or to meet any emergency.

In order to give the machine a positive initial upward impetus when starting the propellers or fans 11, lifters 35 are provided, preferably four in number, and arranged in pairs, each pair being secured to the extremities of a shaft 36. The lifters 35 comprise a series of arms varying in length progressively, the short arm of each being in direct contact with the earth. As the machine moves forward under the impetus of the fans 11 the lifters 35 turn and by reason of the varying and progressive arrangement of the arms 35 the machine is gradually lifted, thereby supplementing the action of the lifting fans and positively overcoming the inertia of the machine at the outstart. It is not necessary that the lifters be attached to shafts as they may be mounted upon the frame-work of the machine in any manner so long as they turn by the combined action of the forward movement of the machine and direct contact of the arms with the earth.

While the rectangular form of the aeroplane 2 is preferred, nevertheless other shapes are contemplated as indicated in Figs. 8, 9, 10 and 11, and in each instance the planes are provided with lifting fans 6 which are set in openings provided in the planes as indicated.

It is to be understood that the several valve members are restored to closed position by the pressure of air in the reservoir 9. It is also to be understood that the manually operable means for admitting the fluid pressure from the reservoir 9 through the various pipes 8 to the different motors is not actuated or correlated to the gravity operative means for opening the valves leading to the pipes 8. The wheel 27 is only used when it is desired to start all the motors simultaneously, and in such event the operator will grasp any two diametrically opposite handles which project outwardly from the wheel 27 and lift the wheel bodily whereby to draw upwardly on all of the wires 29 so as to open all of the valves 21 simultaneously.

Having thus described the invention, what is claimed as new is:

1. A flying machine, comprising a supporting framework, an aeroplane to which the framework is connected, propellers mounted in the framework, motors adapted to drive the propellers, a compressed air reservoir mounted in the framework, supply pipes leading from the reservoir to the respective motors, branch pipes leading from the reservoir and connected to the respective supply pipes, gravity controlled valves in the supply pipes at those ends of the latter which are connected to the reservoir, and valves mounted in the branch pipes and adapted to admit of the air pressure passing from the reservoir through the supply pipes independently of the first-named valves, guides connected to the top of the reservoir, a wheel vertically movable in said guides and provided with a plurality of radially extending handles, means for actuating said last named valves, and connections between such means and said wheel.

2. A flying machine, comprising a framework, an aeroplane to which the framework is connected, propellers mounted in the framework, motors carried by the framework and operatively connected to the propellers, a compressed air reservoir mounted in the framework, and supply pipes leading from the reservoir to the motors, a pendulous rod mounted in the reservoir and having universal swinging movement therein, valves provided with tubular body portions adapted to be slipped into the ends of the supply pipes from the reservoir and provided with gasketed heads within the reservoir, the barrels being formed with openings adapted to form communications between the interior of the reservoir and the interior of the supply pipes, and flexible connections between the pendulous rod and the heads of the said valves.

3. A flying machine, comprising a framework, an aeroplane to which the framework is connected, propellers mounted in the framework, motors operatively connected to the propellers, a compressed air reservoir mounted in the framework, and supply pipes connected to the reservoir and to the respective motors, branch pipes leading from the reservoir to the supply pipes, gravity controlled valves for the main portions of the supply pipes, reciprocating valves in the inner ends of the branch pipes adapted to establish communication between the interior of said branch pipes and the interior of the reservoir, hollow guides connected with the branch pipes, bars provided with oppositely inclined portions and mounted to move in said guides, means for moving said bars, and pins connected to the respective last named valves and adapted to be engaged by the inclined portions of the bars, whereby to move said valves in one direction.

4. In a flying machine, a plurality of propellers, motors for driving same, a compressed air reservoir, a series of circularly arranged supply pipes connected to the reservoir and to the respective motors, manually operable valves adapted to control the communication between the supply pipes and the interior of the reservoir, a hand wheel mounted on top of the reservoir and provided with a plurality of radially extending hand grasps, the hand wheel being arranged for a vertical movement, and means for opening said valves, said means including wires that are connected to the hand wheel.

5. In a flying machine, a horizontal plane, planes connected to the side edges of said horizontal plane, and inclined upwardly and outwardly therefrom, the inclined planes being formed with openings, wings set in said openings, means for moving said wings, the horizontal planes being also formed with openings, lifting vanes mounted in said last named openings, and means for operating said vanes.

In testimony whereof I affix my signature in presence of two witnesses.

ALBERT HUGO FRIEDEL. [L. S.]

Witnesses:
W. N. WOODSON,
V. B. HILLYARD.